United States Patent
Felber et al.

(10) Patent No.: US 6,355,091 B1
(45) Date of Patent: Mar. 12, 2002

(54) VENTILATING DEHUMIDIFYING SYSTEM USING A WHEEL FOR BOTH HEAT RECOVERY AND DEHUMIDIFICATION

(75) Inventors: Steven M. Felber, Eagan; Timothy J. Smith, Minneapolis; Brad A. Terlson, Maple Grove, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/518,924

(22) Filed: Mar. 6, 2000

(51) Int. Cl.[7] ............................................. B01D 53/06
(52) U.S. Cl. ................... 95/10; 95/11; 95/113; 95/126; 96/111; 96/112; 96/125; 96/127; 96/130; 96/150; 96/154
(58) Field of Search ...................... 95/10, 11, 107, 95/113, 117, 121, 126; 96/111, 112, 124–130, 146, 150, 154

(56) References Cited

U.S. PATENT DOCUMENTS

| | | | |
|---|---|---|---|
| 2,200,243 A | * | 5/1940 | Newton et al. ............ 96/111 X |
| 2,328,974 A | * | 9/1943 | Guler .......................... 96/112 |
| 2,680,492 A | * | 6/1954 | Kopp ........................... 96/125 |
| 2,700,537 A | | 1/1955 | Pennington |
| 2,946,201 A | * | 7/1960 | Munters .................... 96/125 X |
| 3,398,510 A | * | 8/1968 | Pennington ............... 96/125 X |
| 3,774,374 A | * | 11/1973 | Dufour et al. ................ 96/112 |
| 3,844,737 A | * | 10/1974 | Macriss et al. ............ 96/125 X |
| 4,180,985 A | * | 1/1980 | Northrup, Jr. ................. 62/94 |
| 4,341,539 A | * | 7/1982 | Gidaspow et al. ............ 96/127 |
| 4,474,021 A | | 10/1984 | Harband |
| 4,574,872 A | * | 3/1986 | Yano et al. ................... 96/125 |
| 4,769,053 A | * | 9/1988 | Fischer, Jr. .................. 55/389 |
| 4,926,618 A | * | 5/1990 | Ratliff ....................... 96/111 X |
| 4,952,283 A | | 8/1990 | Besik ............................ 165/4 |
| 5,148,374 A | * | 9/1992 | Coellner .................... 96/112 X |
| 5,179,998 A | * | 1/1993 | Des Champs .................. 165/1 |
| 5,238,052 A | * | 8/1993 | Chagnot ................... 96/125 X |
| 5,584,916 A | * | 12/1996 | Yamashita et al. ............ 96/130 |
| 5,752,323 A | | 5/1998 | Hashimoto et al. |
| 5,791,153 A | | 8/1998 | Belding et al. ................ 62/93 |
| 5,826,434 A | | 10/1998 | Belding et al. ................ 62/90 |
| 6,199,388 B1 | * | 3/2001 | Fischer, Jr. ............... 96/125 X |

FOREIGN PATENT DOCUMENTS

| | | |
|---|---|---|
| EP | 0462828 A2 | 12/1991 |
| WO | WO0011409 A | 3/2000 |

* cited by examiner

Primary Examiner—Robert H. Spitzer

(57) ABSTRACT

A ventilation and dehumidification system for ventilating fresh air to a conditioned space. The system is comprised of a unitary heat transfer desiccant wheel for dehumidifying incoming air by exchanging moisture from an inflow current of air with an outflow current of air. The unitary heat recovery wheel is able to transfer heat between the two air currents when the wheel is spun at a faster speed. The unitary heat transfer desiccant wheel is both regenerated and defrosted by a regenerative heater which is placed to heat the outflow current of air before the outflow current passes through the unitary heat transfer desiccant wheel. The unitary heat transfer desiccant wheel is spun at a slow speed to accomplish more dehumidification, and at a fast speed to accomplish more heat recovery. The system includes at least two blowers in order to motivate the inflow and outflow currents of air. The blowers can be arranged so as to create an air pressure differential between the inflow chamber and the outflow chamber so that any leakage of air between the two chambers will occur from the inflow chamber to the outflow chamber.

18 Claims, 4 Drawing Sheets

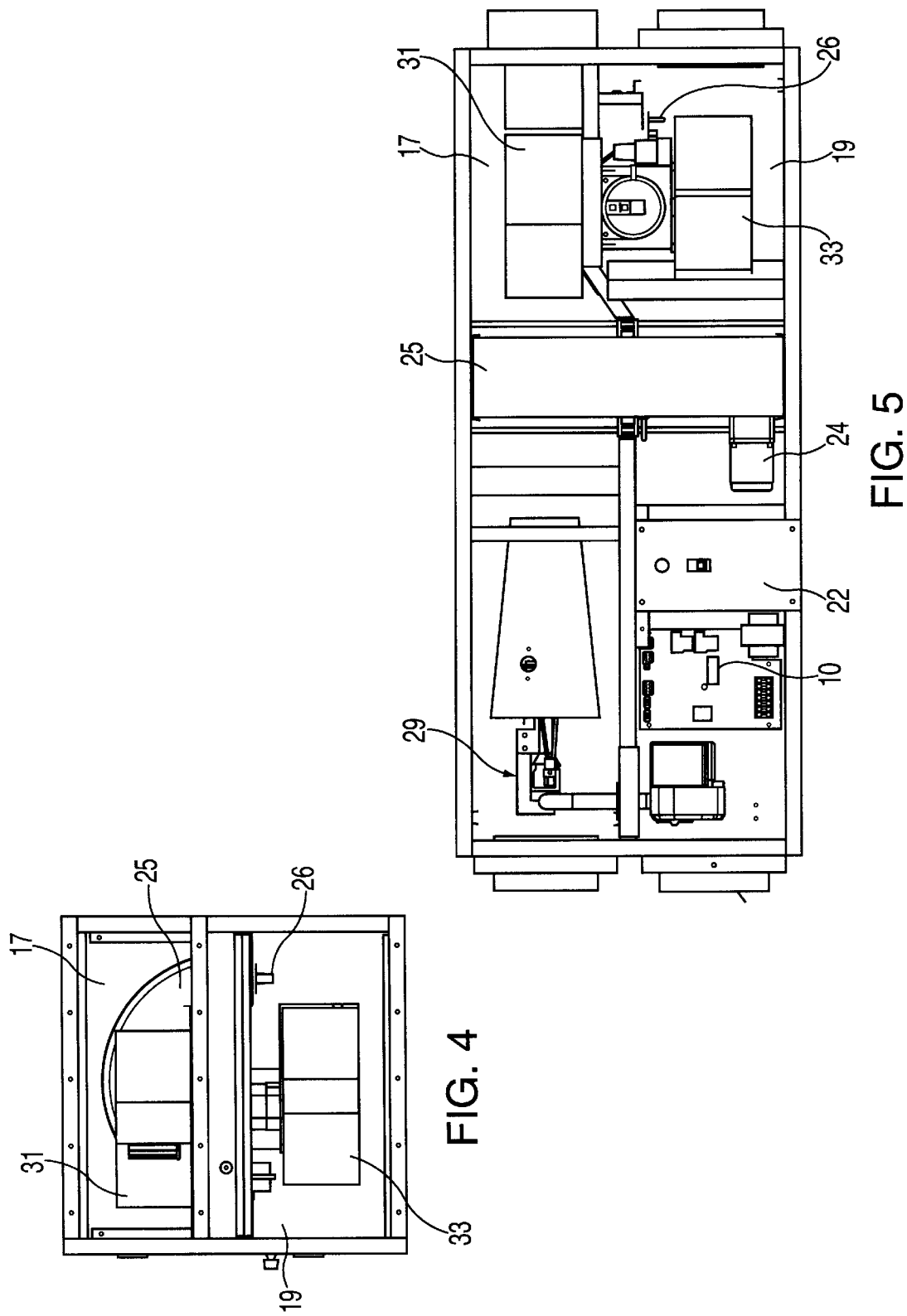

VENTILATING DEHUMIDIFYING SYSTEM USING A WHEEL FOR BOTH HEAT RECOVERY AND DEHUMIDIFICATION

Reference is made to the following copending patent applications all of which were filed on the same date as the present application, and all of which are incorporated in the present application as if fully set forth herein: Heat Recovery Ventilator with Make-up Air Capability, application Ser. No. 09/518,923; Ventilating Dehumidifying System, application Ser. No. 09/519,484; Ventilating Dehumidifying System Using a Wheel Driven by Variable Speed Pulsing Motor, application Ser. No. 09/519,516; Dehumidifier Using Non-Rotating Desiccant Material, application Ser. No. 09/519,870.

BACKGROUND OF THE INVENTION

The present invention relates to air ventilation and an improved air ventilation system which includes both heat recovery and dehumidification.

ANSI/ASHRAE Standard 62-1989 was established to address the need for increased ventilation of buildings due to poor indoor air quality. Increased levels of contaminants from humans, fuel burning appliances, building materials and furnishings have resulted from the current construction practices which produce tighter, low leakage buildings. For example, volatile organic compounds (VOCs) such as formaldehyde have been identified which with continued exposure can cause illness. Recommended ventilation rates range from about 0.3 air changes per hour to over 1.0 air changes per hour. The actual level of recommended outdoor air intake depends on the use, size and occupancy of the building.

Indoor air quality is also affected by the presence of living organisms in the circulated air. Bacteria, mold and mildew, for example, thrive when damp conditions exist in the building and air ducts. For this reason, reduction of humidity levels is not only a comfort concern but also a health concern. Homeowners can reduce their exposure to harmful bacteria, mold and mildew by regulating the humidity level within their homes.

Homeowners also are becoming more aware of the importance of including air ventilation systems within their homes. Therefore, there exists a need for smaller, less complex, less expensive ventilation and dehumidification systems that are appropriate for residential use.

The present system relates to devices that combine ventilation and dehumidification. One type of such devices uses sorptive wheels that transfer heat or moisture from one air stream to another. Although the art is cognizant of "unitary" sorptive wheels that are able to exchange both heat and moisture, the typical ventilating/dehumidifying device uses multiple wheels; usually at least one wheel is primarily a heat exchanger and at least one other wheel is primarily a moisture exchanger. The use of multiple wheels is likely motivated by the fact that a single wheel, operating always at a predetermined speed, is unable to transfer both heat and moisture at maximum efficiency. The shortfall in efficiency of the single wheel arises from the fact that heat transfer which is essential in the ventilating process, is maximized by rotating the wheel at much higher speeds than the speeds required to optimize moisture transfer, which is essential in the dehumidifying process.

The present invention is a device that allows the use of a single sorptive wheel while performing the ventilation and dehumidification functions at optimal levels. In the device, optimization of heat or moisture transfer is achieved by varying the speed of the sorptive wheel. In dehumidification mode, the wheel is rotated slowly, while in ventilation mode the wheel is rotated much faster.

U.S. Pat. No. 5,148,374 discloses a desiccant space conditioning system using multiple sorptive wheels. Although the invention discloses modifying the speeds of the wheels to optimize the effectiveness of the system for various fluid flow rates, temperatures, and water vapor concentrations, the invention does not teach the varying the speed of a single wheel in order to achieve an entirely different function with the same wheel.

U.S. Pat. No. 4,769,053 discloses an air treatment system utilizing a sorptive wheel that is capable of transferring both heat and moisture with high efficiency. The wheel incorporates layers of heat exchanger material with layers of moisture transfer (desiccant) material. However, the invention is concerned with constructing a wheel that will exchange heat and moisture given the constraint of a constant speed, not in varying the speed of the wheel to accomplish the two functions.

U.S. Pat. No. 4,180,985 discloses an improved method and apparatus for air conditioning, using a refrigeration system. The disclosed method and apparatus provide for a refrigerant based air conditioning system to be equipped with a regenerable desiccant for contacting moist feed air prior to passing the feed air across evaporator coils of the system. The desiccant removes a substantial portion of moisture from the feed air, thereby improving the efficiency of the air conditioning system. The desiccant material is regenerated by utilizing waste heat that is removed from the condenser of the air conditioning system.

U.S. Pat. No. 5,179,998 discloses a heat recovery ventilating dehumidifier which is a multifunction device for the treatment of air. The invention, however, uses compression and refrigeration in order to achieve dehumidification.

SUMMARY OF THE INVENTION

In accordance with the present invention there is provided a ventilation and dehumidification system for ventilating fresh air to a conditioned space. The system is comprised of a unitary heat transfer desiccant wheel for dehumidifying incoming air by exchanging moisture from an inflow current of air with an outflow current of air. In addition the unitary heat recovery wheel is able to transfer heat between the two air currents when the wheel is spun at a faster speed. The unitary heat transfer desiccant wheel is both regenerated and defrosted by a regenerative heater which is placed to heat the outflow current of air before the outflow current passes through the unitary heat transfer desiccant wheel. A multispeed or variable speed motor spins the unitary heat transfer desiccant wheel at a slow speed to accomplish more dehumidification, and at a fast speed to accomplish more heat recovery. The system includes at least two blowers in order to motivate the inflow and outflow currents of air. The blowers can be arranged so as to create an air pressure differential between the inflow chamber and the outflow chamber so that any leakage of air between the two chambers will occur from the inflow chamber to the outflow chamber.

BRIEF DESCRIPTION OF THE DRAWING

FIG. 4 shows an back view of one embodiment of the system with a back panel removed to expose the interior of the system.

FIG. 5 shows a side view of the embodiment shown in FIG. 2.

DETAILED DESCRIPTION

Figure 1:
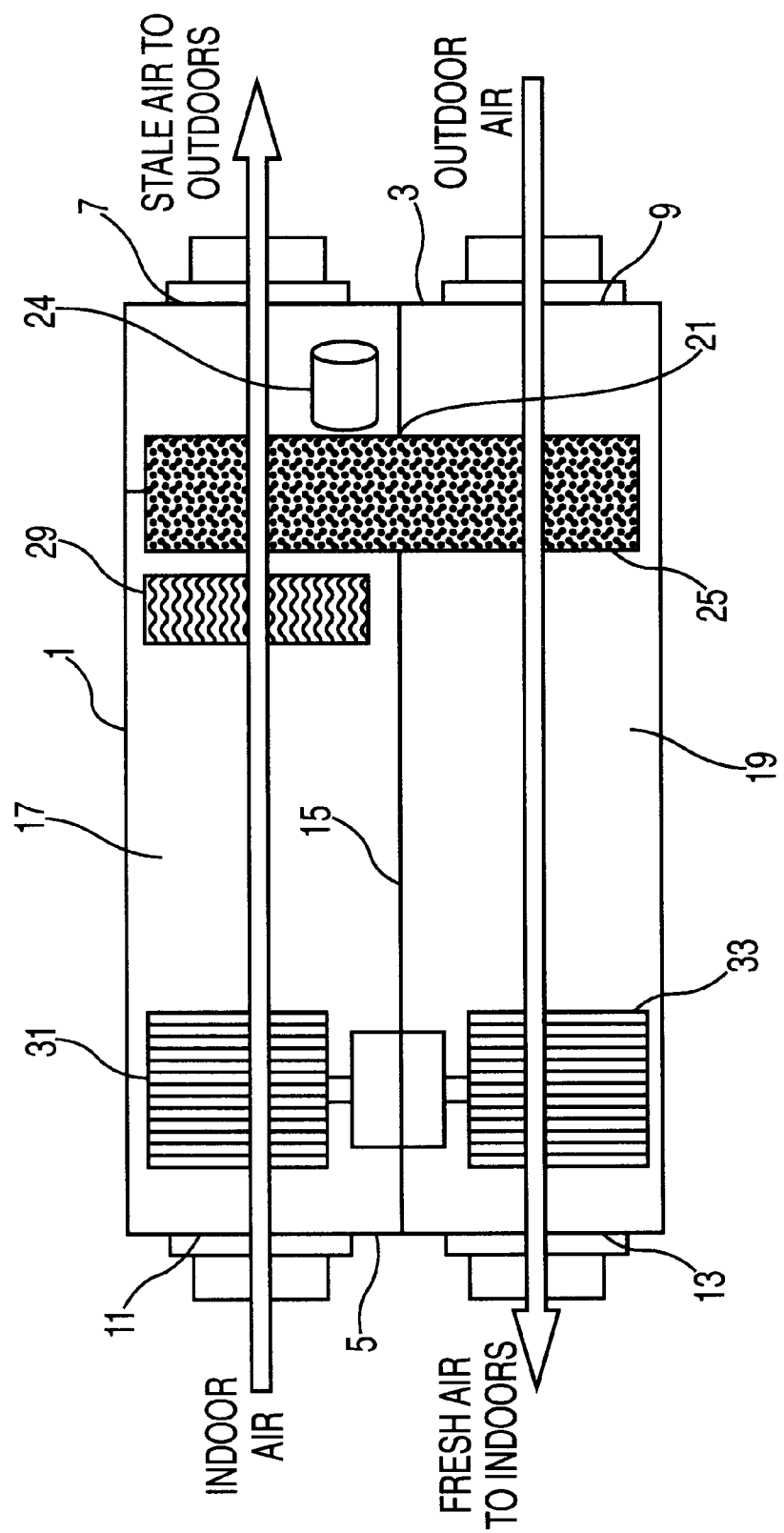
FIG. 1 shows a schematic diagram of one embodiment of the system.

Referring to the drawings, FIG. 1 shows one preferred embodiment of a system for economically ventilating and dehumidifying a conditioned space. The system comprises a unit housing 1 typically made of sheet metal or plastic, having both a back panel 3 and a front panel 5. The unit housing 1 is generally rectangular with back panel 3 and front panel 5 making up opposite sides of the rectangular unit housing 1.

Within the back panel 3 there are two apertures, the first aperture being the outdoor exhaust aperture 7, and the second aperture being the outdoor intake aperture 9. The outdoor exhaust aperture 7 is in communication with outdoor air. Alternatively the outdoor exhaust aperture could be in communication with other piping or ductwork which itself would be in communication with outside air. The outdoor intake aperture 9 is also in fluid communication with outdoor air or other ductwork which is itself in communication with outside air. The outdoor exhaust aperture 7 functions as the port through which stale air is expelled from the system to the outside. Meanwhile, the outdoor intake aperture 9 functions as the port through which the system obtains fresh air to be supplied to the conditioned space.

Within the front panel 5 there are two apertures, an indoor intake aperture 11 and an indoor exhaust aperture 13. Both the indoor intake aperture 11 and the indoor exhaust aperture 13 are in fluid communication with the indoor air of the conditioned space or other piping which is itself in communication with indoor air. The indoor intake aperture 11 functions as the port through which stale air from the conditioned space is supplied to the system. The indoor exhaust aperture 13 is the port through which fresh, dehumidified air is supplied from the system to the conditioned space. Within the interior of the unit housing 1, there is a divider wall 15 which acts with the unit housing 1 and the back panel 3 and the front panel 5 to define an outflow chamber 17 and an inflow chamber 19. The inflow chamber 19 is in fluid communication with the outdoor intake aperture 9 and the indoor exhaust aperture 13 thereby allowing an inflow current of air to flow from the outdoor intake aperture 9 through the inflow chamber 19 and out the indoor exhaust aperture 13. The outflow chamber 17 is in fluid communication with the outdoor exhaust aperture 7 and the indoor intake aperture 11 thereby allowing an outflow current of air to flow from the indoor intake aperture 11 through the outflow chamber 17 and out the outdoor exhaust aperture 7. The divider wall 15 defines at least one wheel aperture 21.

The wheel aperture 21 in the divider wall 15 allows the rotating unitary heat transfer desiccant wheel 25 to pass through the divider wall 15. The rotating unitary heat transfer desiccant wheel 25 is placed within both the outflow chamber 17 and the inflow chamber 19 so that its axis of rotation is substantially parallel to the flow of both the inflow current of air and the outflow current of air.

The unitary heat transfer desiccant wheel 25 operates in a first mode as a dehumidifying element by adsorbing moisture from the inflow current of air within the inflow chamber 19. Then by rotation of the wheel, the portion of the wheel containing the moisture passes to the outflow chamber 17 where the moisture is expelled to the outflow current of air. The regenerative heater 29 encourages release of moisture from the rotating desiccant wheel 25 by heating the outflow current of air before it passes through the desiccant wheel 25. As the rotating unitary heat transfer desiccant wheel 25 spins, it continually adsorbs moisture from the inflow current of air in the inflow chamber 19 and subsequently expels that moisture in the outflow chamber to the outflow air current, thereby dehumidifying the inflow current of air.

Additionally the unitary heat transfer desiccant wheel 25 operates in a second mode as a heat transfer wheel. In this mode, the unitary heat transfer desiccant wheel 25 transfers heat between the inflow and outflow currents of air. In warm weather, as a portion of the unitary heat transfer desiccant wheel 25 passes through the inflow chamber the wheel gains heat. Subsequently, when the heated portion of the unitary heat transfer desiccant wheel 25 passes through the outflow chamber, the heat is transferred from the wheel to the outflow air. Therefore, in warm weather the unitary heat transfer desiccant wheel 25 transfers heat from the inflow current of air to the outflow current of air, thereby conserving energy necessary to cool the conditioned space. In cold weather the unitary heat transfer desiccant wheel 25 would transfer heat from the outflow current of air to the inflow current of air. The wheel would gain heat as it passed through the outflow chamber 17 and release that heat to the inflow current of air after rotating into the inflow chamber 19. Thereby, in cold weather the unitary heat transfer desiccant wheel 25 acts to reduce heating costs.

The unitary heat transfer desiccant wheel 25 operates more efficiently as a dehumidifier when rotated at relatively slow speeds. Typically, in order for the wheel to operate efficiently as a dehumidifier the wheel may be spun on the order of 20 revolutions per hour; however, the efficient speeds vary depending on the physical parameters of the wheel. These same wheels operate as heat transfer wheels efficiently when rotated at speeds on the order of 20 revolutions per minute (1200 revolutions per hour). Therefore, by spinning the same wheel at different speeds the system can act both as a heat recovery ventilator and as a dehumidifying ventilator.

It should be noted that the two modes of operation are not mutually exclusive. The wheel can be spun at a range of speeds to emphasize either dehumidification or heat recovery to lesser or greater extents.

The unitary heat transfer desiccant wheel 25 is typically formed of a substrate on which desiccant material has been coated or impregnated. The substrate could be fiberglass, paper, aluminum, or titanium. In the preferred embodiment the substrate is formed of fiberglass. The desiccant is a silica gel. Desiccant wheels are known in the art and are commercially available. One preferred embodiment uses a Tigel Amorphous Silica Gel Desiccant Wheel Model # 30612-01 manufactured by Munters Corporation. For example a 14 1/8" diameter by 3.65" thick desiccant wheel enables the system to remove the targeted amount of 100 pints of moisture per day at an outside air temperature of 80° Fahrenheit, at 60% relative humidity, and at an airflow rate of 200 cubic feet per minute.

As previously indicated, within the outflow chamber 17 there is a regenerative heater 29 placed near enough to the unitary heat transfer desiccant wheel 25 in order to regenerate or dry the unitary heat transfer desiccant wheel when in operation. The regenerative heater 29 may be constructed using an electric heating element, hot water elements, or, in the preferred embodiment, a natural gas burner such as is commonly found in clothes dryers.

Another role of regenerative heater 29 in the system is that the regenerative heater 29 is able to defrost the unitary heat transfer desiccant wheel during ventilation. In cold climates, the moisture collecting on the desiccant wheel 25 can become frozen. In this case, prior art ventilation systems close off the outside air intake and recycle warm interior air through the system until the desiccant wheel defrosts. The present system, however, is able to use the heat output of the regenerative heater 29 in order to defrost the desiccant wheel without stopping or interrupting the ventilation process. Both the ventilation and defrost modes of the system can operate simultaneously.

In order to power the unitary heat transfer desiccant wheel 25 a wheel motor assembly 24 must be included in the system. The motor assembly 24 must be capable of multiple or variable speeds. A variable speed 120 volt, 0.2 amp AC motor with 75 ounce-inch starting torque may be used in conjunction with a belt assembly or friction rollers to rotate the unitary heat transfer desiccant wheel 25. Alternatively, the motor may rotate the center shaft of the wheel directly. Such motors are commercially available and are known in the art.

Within the outflow chamber, there is an exhaust blower 31 which moves the outflow current of air from the indoor intake aperture 11, through the outflow chamber 17, past the regenerative heater 29, past the unitary heat transfer desiccant wheel 25 and out the outdoor exhaust aperture 7. Similarly, within the inflow chamber 19 there is an intake blower 33 which moves the inflow current of air from the outdoor intake aperture 9, past the unitary heat transfer desiccant wheel 25, and out the indoor exhaust aperture 13. Examples of blowers 31 and 33 include squirrel cage blowers, axial fans, propellers and other devices capable of creating a current of air. The size of blowers 31 and 33 can vary as desired, depending on the system design and size. The blowers 31 and 33 in one embodiment are capable of moving 200 cubic feet per minute at 0.1 inches of water column pressure. Fasco Motors Group manufactures blowers suitable for this purpose.

Figure 2:
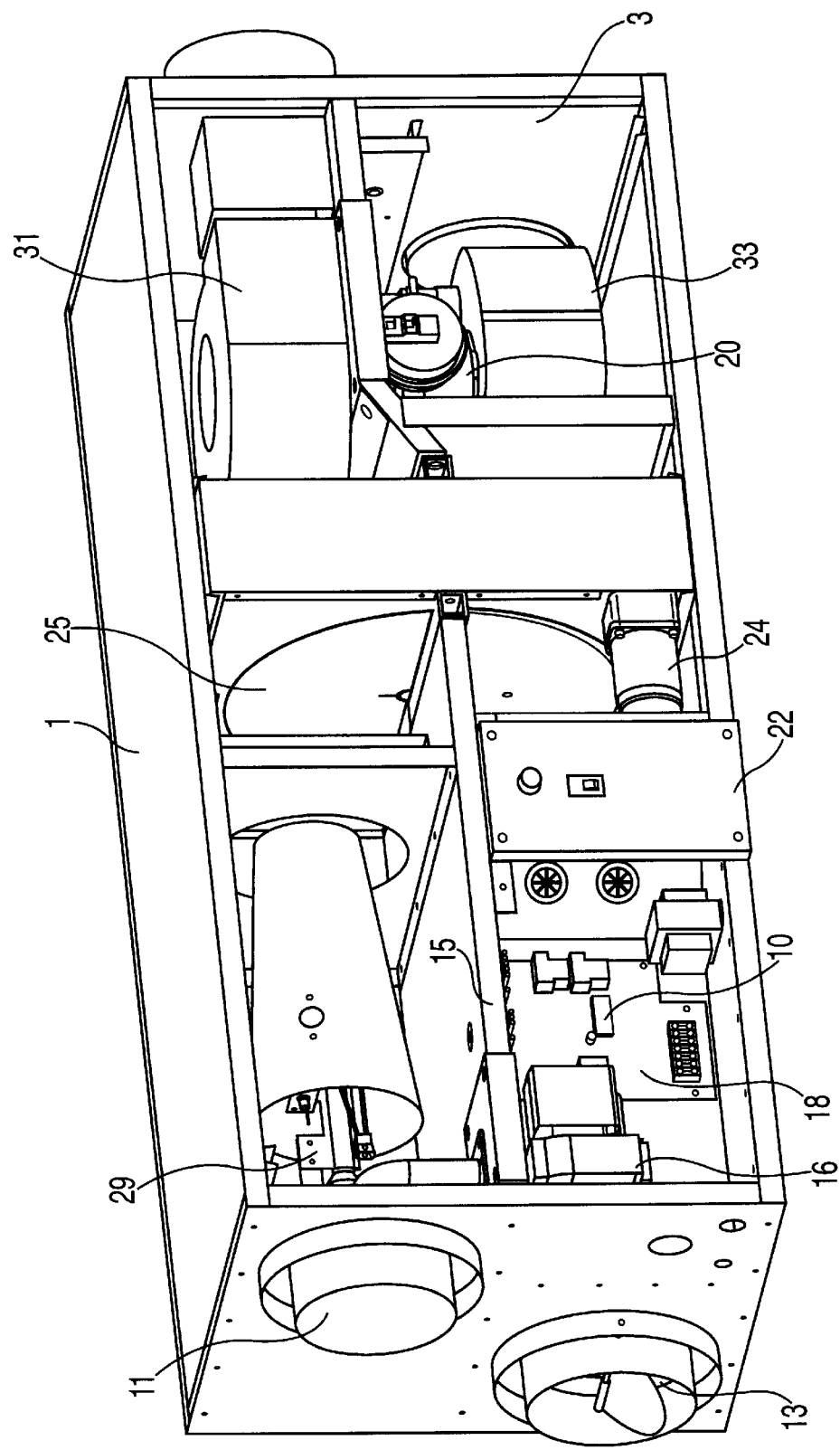
FIG. 2 shows a left perspective view of one embodiment of the present system with a side panel of the unit housing removed to expose an interior view of the system.

Referring now to FIG. 2, in order to prevent either blower from operating independently without the other blower, blowers 31 and 33 can be arranged so that they are powered by the same blower motor 20. In such a configuration, the inflow current of air may equal the outflow current of air, preserving the relative pressure of the conditioned space with the outside air.

Alternatively, blowers 31 and 33 can be arranged (shown in FIGS. 2 and 3) so that there exists a pressure bias between the outflow chamber 17 and the inflow chamber 19. By placing the exhaust blower 31 and the intake blower 33 near the back panel 3, the outflow current of air is essentially pulled from the indoor intake aperture 11 to the outdoor exhaust aperture 7, whereas the inflow current of air is pushed from the outdoor intake aperture 9 to the indoor exhaust aperture 13. Because the inflow current of air is pushed through the system while the outflow current of air is pulled through the system, there exists a pressure bias between the inflow and outflow chambers 17 and 19. This bias prevents stale, contaminated air from leaking out of the outflow chamber 17 and into the inflow chamber 19. Instead, to the extent there exists openings between the inflow and outflow chambers 17 and 19, the inflow current of air will be forced to leak into the outflow chamber 17 by the difference in air pressures.

In the embodiment shown in FIG. 1, the blowers 31 and 33, and unitary heat transfer desiccant wheel 25 can be operated independently of each other, thereby allowing several different modes of operation for the system. When the exhaust blower 31 and the intake blower 33 are ON and the desiccant wheel 25 and regenerative heater 29 are OFF, the system will function as a simple ventilator. Alternatively, the system can be operated in a second mode where the exhaust blower 31 and the intake blower 33 are ON, the unitary heat transfer desiccant wheel 25 is spun at a relatively slow speed and the regenerative heater 29 is ON, so that the system functions as a dehumidifier and ventilator with relatively little heat transfer between the inflow current of air and the outflow current of air. In addition, the system can operate in a mode where the intake blower 33 and the exhaust blower 31 are ON, the unitary heat transfer desiccant wheel 25 is spun at a faster speed and the regenerative heater 29 is OFF, so that the system functions as a ventilator with heat recovery. At any time during operation of the system as a ventilator the regenerative heater 29 can heat the outflow current of air sufficiently to defrost the unitary heat transfer desiccant wheel 25.

Figure 3:
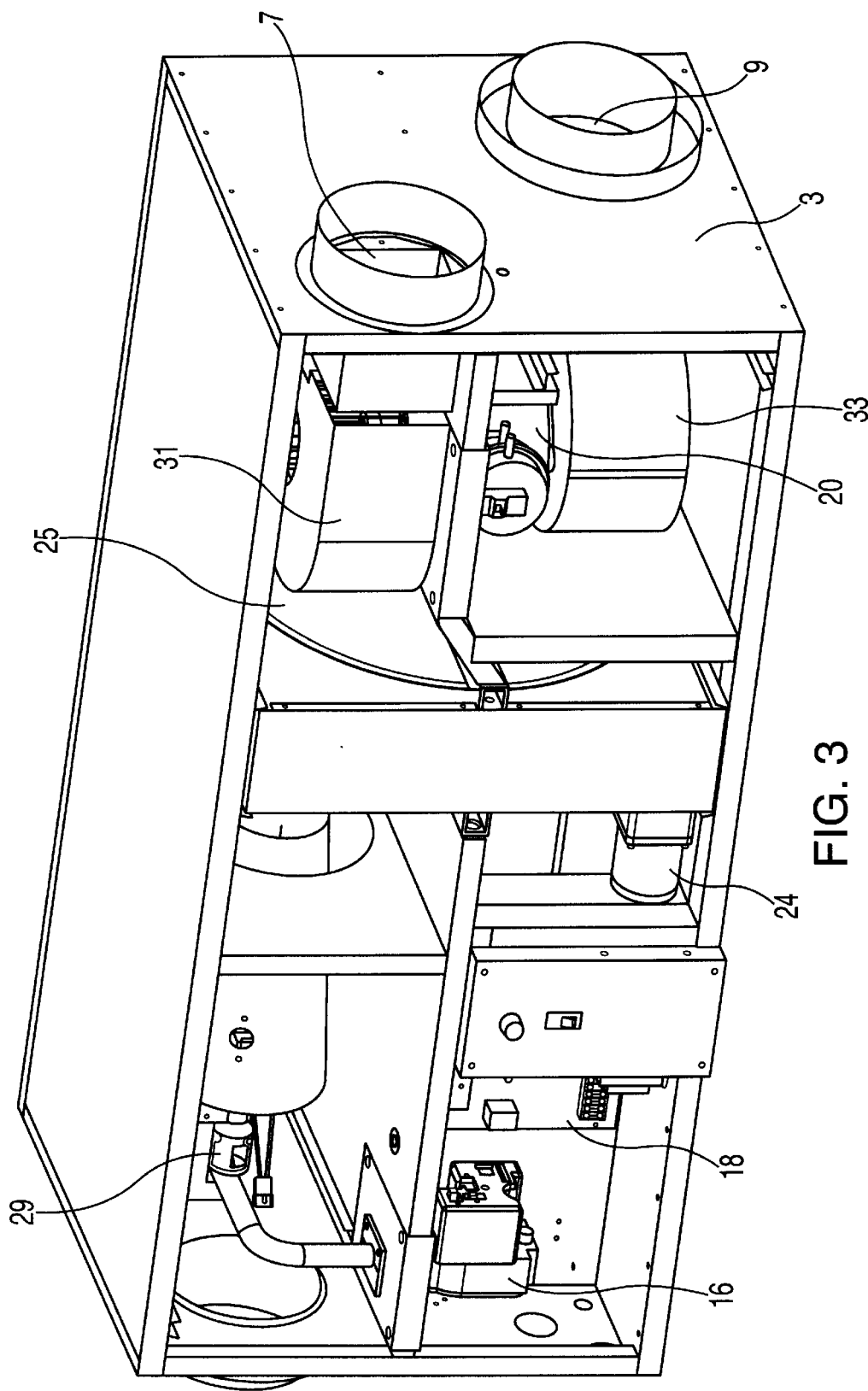
FIG. 3 shows a right perspective view of the embodiment shown in FIG. 2.

FIG. 2 and FIG. 3 show one embodiment of the present system configured with a unitary heat transfer desiccant wheel 25. The unitary heat transfer desiccant wheel 25 is coupled to the motor assembly 24. The blowers 31 and 33 are configured to be operated by a single blower motor 20. The blowers 31 and 33 are also arranged to create a pressure bias between the inflow chamber and the outflow chamber as discussed above. The embodiment shown in FIG. 2 and FIG. 3 includes a regenerative heater 29 which typically is a gas burner with gas valve 16. A wiring board 18 on which may be disposed a controller logic unit 10 is also shown.

One embodiment of the present system includes a control panel 22 which may be configured to enable the user to select the desired mode from the above modes by turning the various elements on or off as desired.

Another embodiment of the system includes both thermisters and RH sensors to measure the temperature and humidity inside and outside the conditioned space. FIG. 4 and FIG. 5 show an embodiment of the system configured with a sensor 26 within the inflow chamber 19 for detecting the condition of the inflow current of air. The system may also or alternatively be electrically connected to the home thermostat for monitoring indoor air conditions. When coupled to a controller logic unit 10 the system then may be configured to select automatically the preferred operating mode that will most efficiently achieve desired temperature and humidity levels.

Acceptable thermisters and RH sensors are commercially available and can be obtained from Stetron International, Inc. and TDK USA Corp. The controller logic unit may be any programmable microprocessor such as a Motorola HC705, JP7 micro-controller.

The above specification, examples and data provide a description of the manufacture and use of the invention. Many embodiments of the invention can be made without departing from the spirit and scope of the invention as defined by the claims following below:

We claim:

1. A method of ventilating fresh air to a conditioned space by exchanging heat and moisture with exhaust air, the method comprising the steps of:

(a) providing a heat transfer desiccant wheel capable of transferring both heat and moisture between the fresh air and the exhaust air, (b) selecting a preferred speed at which to rotate the heat transfer desiccant wheel to maximize either heat transfer or moisture transfer, (c) rotating the heat transfer desiccant wheel at the preferred speed, (d) introducing both fresh air and exhaust air to the heat transfer desiccant wheel thereby transferring heat and moisture between the fresh and exhaust air, (e) directing the fresh, conditioned air to the conditioned space, and (f) expelling the stale exhaust air;

whereby the conditioned space is ventilated with dehumidification and heat recovery accomplished efficiently by the same rotating wheel which is rotated at differing speeds to maximize dehumidification or heat recovery.

2. The method of claim 1 wherein the speeds of the heat transfer desiccant wheel differ by a factor of about 60.

3. A ventilating system using variation of rotation speed of a wheel to transfer both heat and moisture between two air currents in order to dehumidify and ventilate a conditioned space, the system comprising:

a housing having both a front and back panel wherein the back panel defines an outdoor exhaust aperture and an outdoor intake aperture, and the front panel defines an indoor exhaust aperture and an indoor intake aperture;

a divider wall disposed within the housing and acting within the housing to define an outflow chamber and an inflow chamber, wherein the outflow chamber is in communication with the indoor intake aperture and the outdoor exhaust aperture, and wherein the inflow chamber is in communication with the outdoor intake aperture and the indoor exhaust aperture, the divider wall further defining a wheel aperture;

an exhaust blower disposed within the outflow chamber for propelling an outflow current of air from the indoor intake aperture through the outflow chamber through the outdoor exhaust aperture;

an intake blower disposed within the inflow chamber for propelling an inflow current of air from the outdoor intake aperture, through the inflow chamber and through the indoor exhaust aperture;

a heat transfer desiccant wheel rotatably coupled to a wheel motor assembly, wherein the wheel passes through the wheel aperture in the dividing wall and is disposed within both the inflow chamber and the outflow chamber with its axis of rotation substantially parallel to the movement of both the inflow and outflow currents of air;

a regenerative heater disposed within the outflow chamber to regenerate the wheel;

wherein the heat transfer desiccant wheel intersects both the inflow current of air and the outflow current of air to exchange both moisture and heat between the inflow and outflow air currents;

and further wherein the wheel motor assembly rotates the heat transfer desiccant wheel at a first speed for increasing moisture transfer between the air currents; and wherein the wheel motor assembly rotates the wheel at a second speed which is faster than the first speed for increasing heat transfer between the air currents;

whereby the ventilation system achieves efficient transfer of both heat and moisture between the inflow and outflow currents of air by spinning the heat transfer desiccant wheel at varying speeds.

4. The system of claim 3 wherein the speeds of the heat transfer desiccant wheel differ by a factor of about 60.

5. The system of claim 3 wherein the system further comprises a control panel adjustable to operate the system in the following modes:

(a) exhaust blower ON, intake blower ON, heat transfer desiccant wheel spinning at the second speed, regenerative heater OFF, whereby the system operates primarily as a heat recovery ventilator;

(b) exhaust blower ON, intake blower ON, heat transfer desiccant wheel spinning at the first speed, regenerative heater ON, whereby the system operates as a dehumidifier and a ventilator;

(c) exhaust blower ON, intake blower ON, heat transfer desiccant wheel OFF, regenerative heater OFF, whereby the system operates as a ventilator with no heat recovery or dehumidification;

(d) exhaust blower OFF, intake blower OFF, heat transfer desiccant wheel OFF, regenerative heater OFF;

whereby the ventilation function of the system can be employed with either dehumidification or heat recovery, or with neither dehumidification nor heat recovery.

6. The system of claim 5 further comprising thermisters and relative humidity sensors for measuring temperature and humidity both inside and outside the conditioned space.

7. The system of claim 6 further comprising a controller logic unit for selecting a preferred operating mode based on a set of input criteria, the temperature, and the humidity both inside and outside the conditioned space;

whereby the system operates automatically to select the preferred operating mode that will best achieve the set of input criteria.

8. The system of claim 3 wherein the intake and exhaust blowers are arranged within the inflow and outflow chambers to produce an air pressure bias between the chambers such that the inflow chamber is at a higher air pressure than the outflow chamber when both blowers operate at the same speed;

whereby the system prevents leakage of stale, contaminated air from the outflow chamber to the inflow chamber.

9. The system of claim 8, wherein the intake and exhaust blowers are powered by a single blower motor, whereby the intake blower cannot operate unless the exhaust blower operates, and whereby the exhaust blower cannot operate unless the intake blower operates.

10. The system of claim 3 wherein the system is configured to ventilate and dehumidify at a rate of at least 100 cubic feet per minute.

11. The system of claim 3 wherein the system is configured to ventilate and dehumidify at a rate of at least 200 cubic feet per minute.

12. The system of claim 3 wherein the regenerative heater is capable of heating the outflow current of air in order to defrost the wheel without interrupting the ventilation function of the system.

13. A variable speed transfer wheel ventilating system comprising:

a housing defining air intake and air outflow chambers;

a desiccant wheel rotatably coupled to a wheel motor system, wherein a first portion of the wheel passes through the air intake chamber and a second portion of the wheel passes through the air outflow chamber;

a blower disposed within the housing;

wherein the wheel motor system is configured to rotate the desiccant wheel at a first speed for increasing moisture transfer between the air currents; and wherein the wheel motor system is configured to rotate the wheel at a second speed which is faster than the first speed for increasing heat transfer between the air currents.

14. The variable speed transfer wheel ventilating system of claim 13 further comprising a regenerative heater disposed within the air outflow chamber to regenerate the desiccant wheel.

15. The variable speed transfer wheel ventilating system of claim 13 wherein the speed of the desiccant wheel differ by a factor greater than one order of magnitude.

16. The variable speed transfer wheel ventilating system of claim 13 wherein the blower is a first blower disposed within the air inflow chamber, and wherein the ventilating system includes a second blower disposed within the air outflow chamber, the first and second blowers being arranged to produce an air pressure bias between the chambers such that the inflow chamber is at a higher air pressure than the outflow chamber when both blowers operate at the same speed, whereby the system prevent leakage of stale, contaminated air from the air outflow chamber to the air inflow chamber.

17. The variable speed transfer wheel ventilating system of claim 13 wherein the system is configured to ventilate and dehumidify at a rate of at least 100 cubic feet per minute.

18. The variable speed transfer wheel ventilating system of claim 13 wherein the system is configured to ventilate and dehumidify at a rate of at least 200 cubic feet per minute.

* * * * *